Dec. 1, 1959 F. E. VACCARO 2,915,675
TUNABLE MAGNETRON
Filed March 15, 1956 7 Sheets-Sheet 3
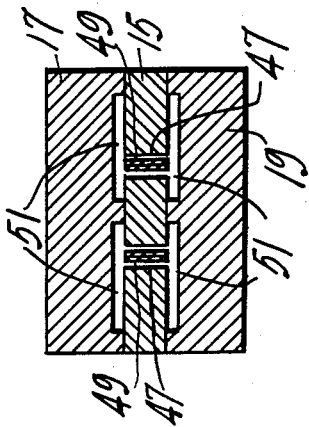
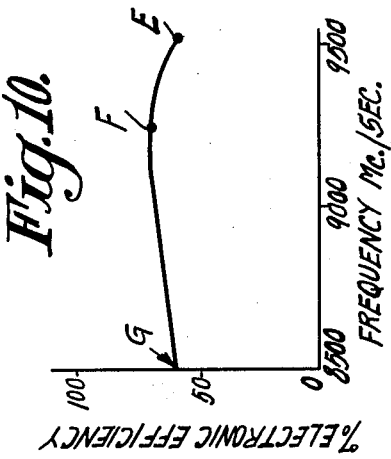
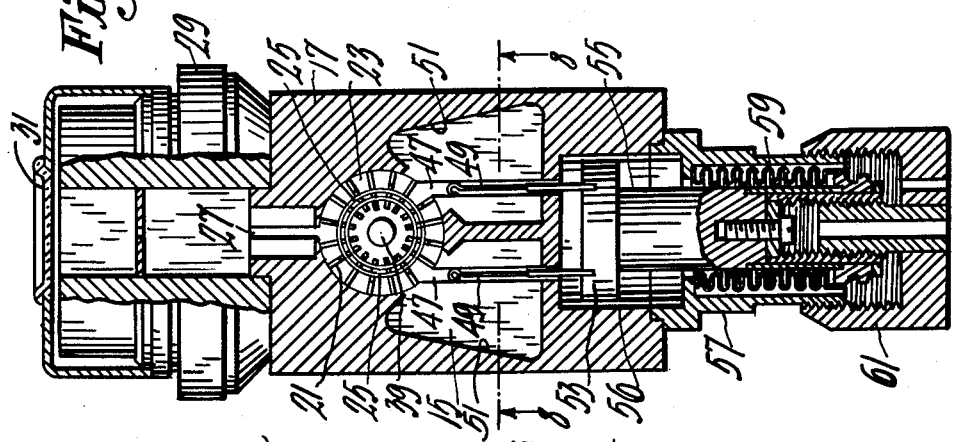
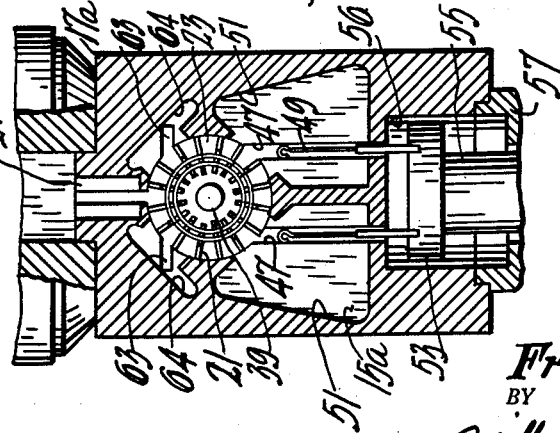
INVENTOR.
Frank E. Vaccaro
BY
William A. Zalesk
ATTORNEY Dec. 1, 1959 F. E. VACCARO 2,915,675
TUNABLE MAGNETRON Filed March 15, 1956 7 Sheets-Sheet 4

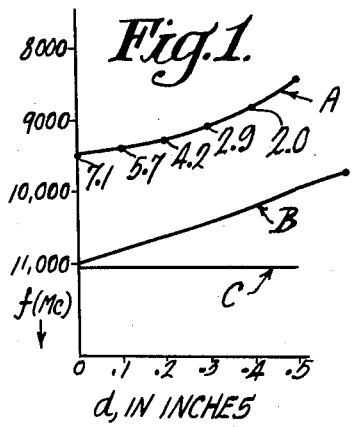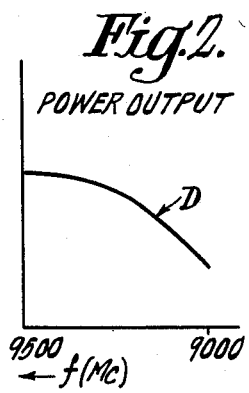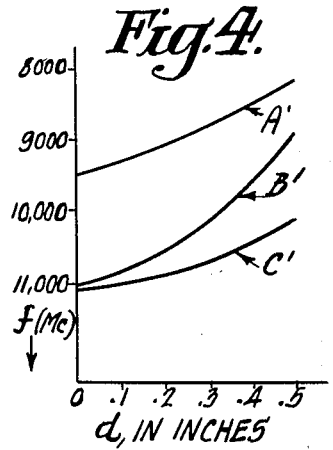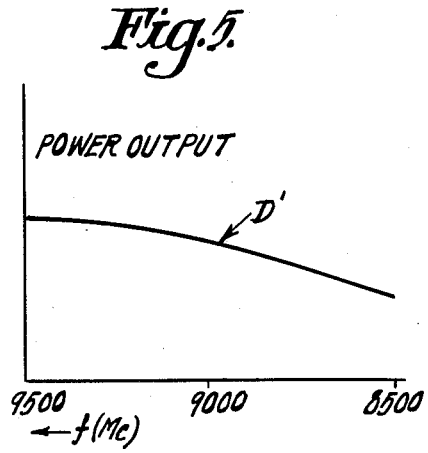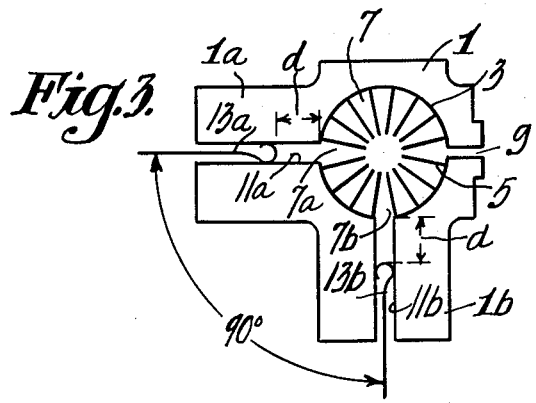

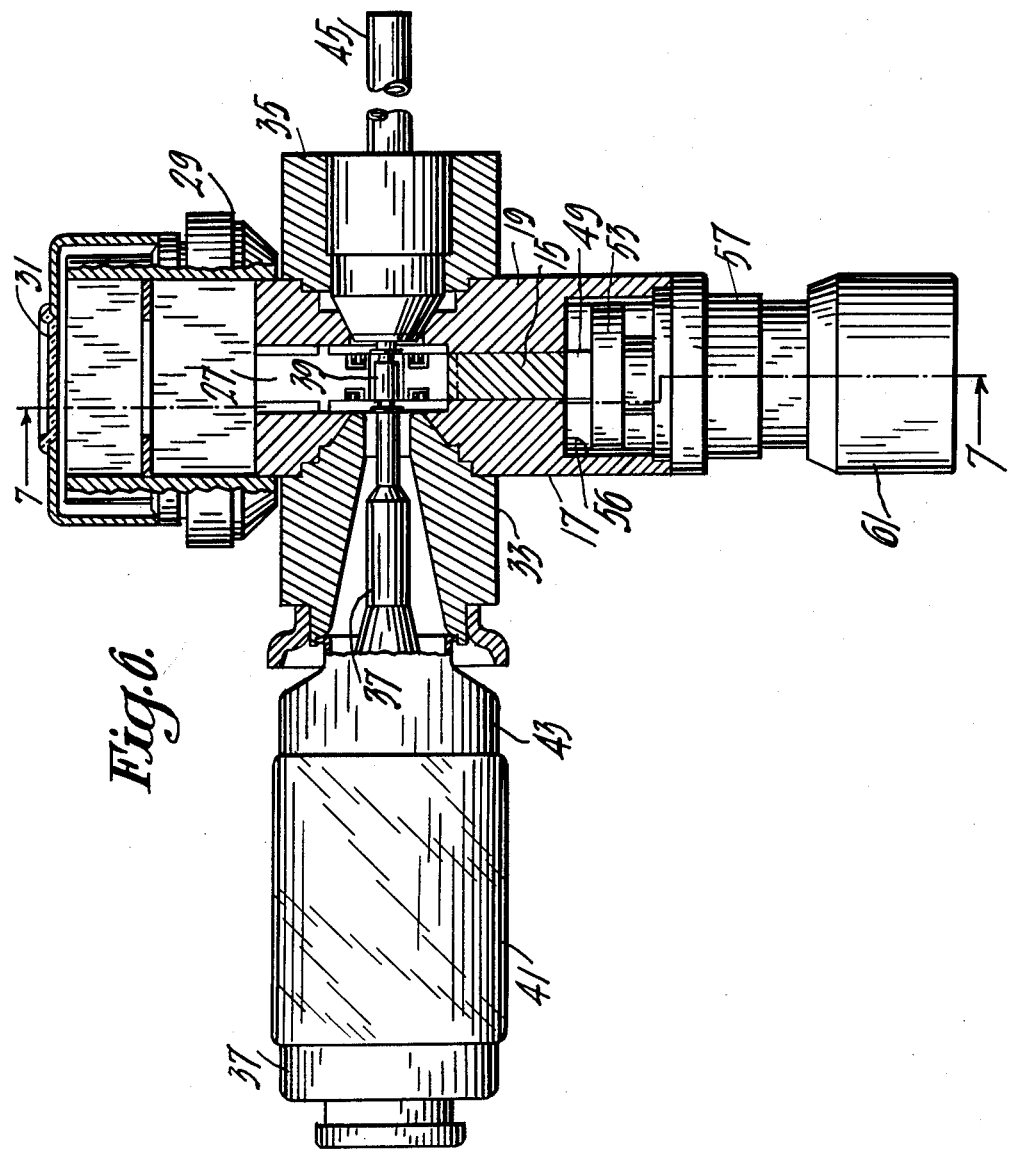

INVENTOR.
Frank E. Vaccaro
BY
William A. Zalesak
ATTORNEY

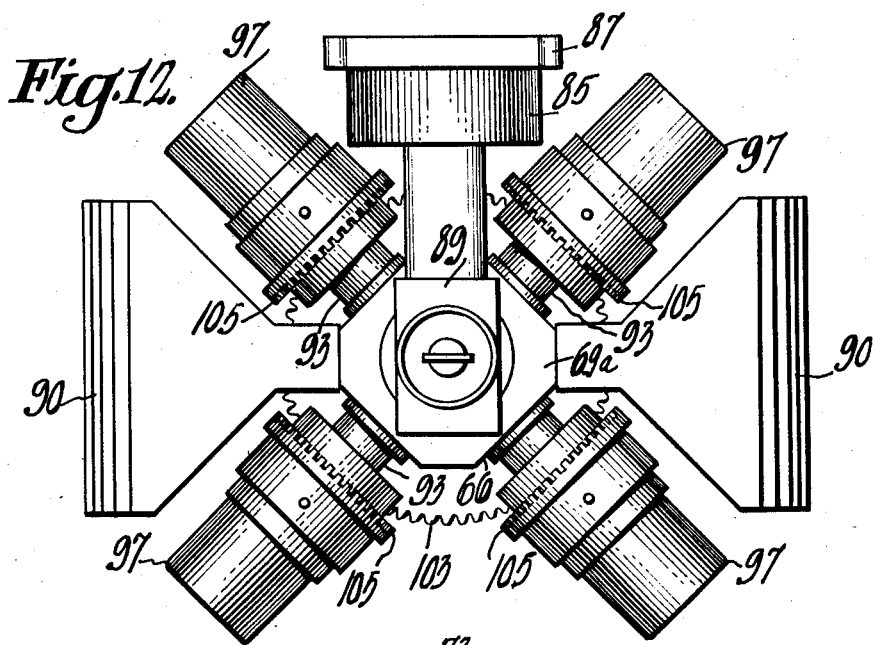
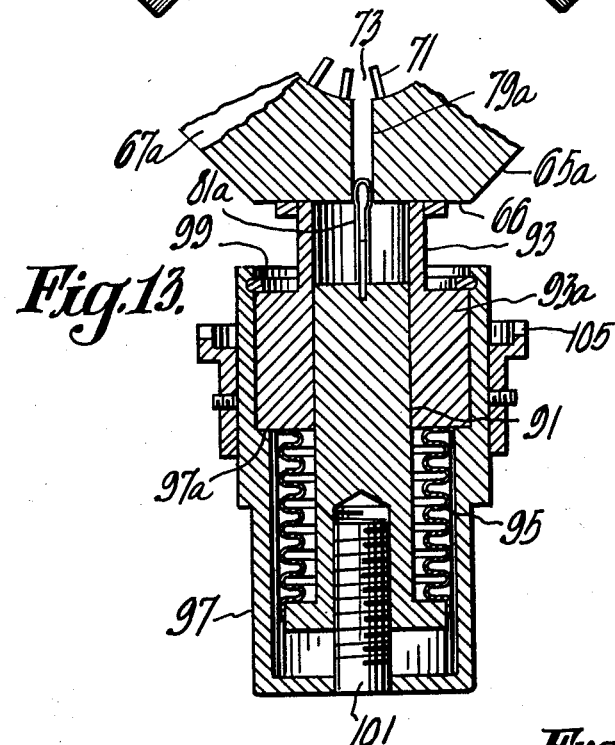

Dec. 1, 1959     F. E. VACCARO     2,915,675
TUNABLE MAGNETRON

Filed March 15, 1956     7 Sheets-Sheet 6

INVENTOR.
Frank E. Vaccaro
BY
William A. Zaluak
ATTORNEY

INVENTOR.
Frank E. Vaccaro
BY
William A. Zalesak
ATTORNEY

United States Patent Office 2,915,675
Patented Dec. 1, 1959

2,915,675

TUNABLE MAGNETRON

Frank E. Vaccaro, Orange, N.J., assignor to Radio Corporation of America, a corporation of Delaware Application March 15, 1956, Serial No. 571,701

16 Claims. (Cl. 315—39.77)

This invention relates to high frequency multi-cavity magnetrons, and particularly to magnetrons with improved external cavity resonator tuning means.

A conventional multi-cavity magnetron comprises an anode block, usually of copper, formed with a cylindrical interaction space containing a thermionic cathode and surrounded by an annular series of radially-extending anode vanes or arms defining spaces therebetween which serve as frequency-determining resonant cavities. The anode cavities are coupled together through the end spaces and the interaction space to form a resonator system. Suitable means, such as permanent magnets or electromagnets, are provided for establishing an axial magnetic field in the interaction space to cause electrons from the cathode to follow curved paths therein. When a direct-current accelerating voltage of suitable value is applied between the cathode and anode, the electrons interact with the anode vane tips, inducing radio frequency voltages therebetween and establishing radio frequency electric fields in the anode cavities. The radio frequency oscillations thus generated can be extracted from the magnetron by suitable means, such as a waveguide or coaxial line coupled to one of the anode cavities.

The frequency of operation of an untuned magnetron is determined primarily by the physical size and shape of the cavities forming the anode resonator system. In operation, magnetrons oscillate in one of several so-called "modes" with different radio frequency field patterns in the anode structure. The number of complete wavelengths around the anode is known as the "mode number," usually designated "$n$." It is usually desirable that the magnetrons oscillate in the "$\pi$ mode" in which the potentials of adjacent anode vane tips, and the radio frequency electric fields in adjacent cavities, are 180° or $\pi$ radians out of phase at any instant. The mode number $n$ of the $\pi$ mode is $N/2$ where N is the total number of anode vanes, or cavities. The mode number just below the desired $\pi$ mode is the $N/2-1$ mode. Each of the modes except the $\pi$ mode has two-fold degeneracy and comprises two close doublets which have the same or different frequencies depending on whether the magnetron resonators are identical or not. Magnetrons are usually "strapped," that is, the anode vane tips are connected together in two sets of alternate vanes by conductors, or otherwise designed to favor operation in the $\pi$ mode. In the case of an untuned symmetrical magnetron, strapping usually produces sufficient separation of the frequencies of the various modes to prevent the magnetron from shifting from the $\pi$ mode to other modes.

It is well known that a magnetron can be tuned over an appreciable range of frequency by tightly coupling a single external tunable cavity resonator to one of the magnetron cavities. For example, a pulsed magnetron of 3 cm. wavelength can be easily tuned over a range of 4 to 5% by this method. However, it is found that such operation is limited by mode jumping as well as varying electronic efficiency. Investigations indicate that the interfering mode is a doublet of the $N/2-1$ mode (the one nearest the desired $N/2$ or $\pi$ mode) which is very loosely coupled to the tuning cavity resonator. The standing waves of the two doublets are displaced or rotated a quarter wavelength relative to each other, and hence, a single tuning cavity resonator having maximum coupling to one doublet does not couple at all to the other doublet. Thus, the other doublet is not tunable and is very lightly coupled to the output line, in which case most of the energy of the untuned mode doublet remains in the anode whereas a portion of the energy in the tunable mode is stored in the tuning resonator. This condition favors operation of the magnetron in the undesired mode, because a large factor controlling the particular mode of operation is the amount of energy stored in the anode.

An object of the present invention is to provide improved means for tuning magnetrons by use of external tunable cavity resonators.

More specifically, the object of the invention is to provide improved external tuning cavity resonators whereby a magnetron can be tuned over a considerable frequency range without moding difficulties and with improved electronic efficiency.

I have found that this object can be achieved, in accordance with the present invention, by providing the magnetron with at least two tunable cavity resonators coupled to the anode cavity structure at points spaced 90° from each other around the cavity array. Although the two tuning cavity resonators may be tuned independently, it is preferable to provide mechanically-ganged means for tuning them simultaneously and equally. Best results can be achieved by providing the magnetron with four identical tuning cavity resonators symmetrically coupled to the anode cavity structure at four points spaced 90° apart around the anode, and gang tuning means therefor.

The invention is described in greater detail in the following description, taken in connection with the accompanying drawings, in which:

Figs. 1 and 2 are graphs showing the operating characteristics of a conventional magnetron with a single external tuning cavity resonator;

Fig. 3 is a plan view of a magnetron anode block incorporating one embodiment of the present invention;

Figs. 4 and 5 are graphs showing the improved operating characteristics of the magnetron partially shown in Fig. 3;

Fig. 6 is an axial sectional view of a magnetron incorporating another embodiment of the invention;

Fig. 7 is a sectional view taken on the line 7—7 of Fig. 6;

Fig. 8 is a transverse sectional view taken on the line 8—8 of Fig. 7;

Fig. 9 is fragmentary view similar to Fig. 7 of a third embodiment of the invention;

Fig. 10 is a graph relating to Fig. 9;

Fig. 12 is a top plan view of a magnetron incorporating the structure shown in Fig. 11;

Fig. 13 is an enlarged axial sectional view of one of the tuning cavity resonators and tuning means of Fig. 12;

Figure 11:
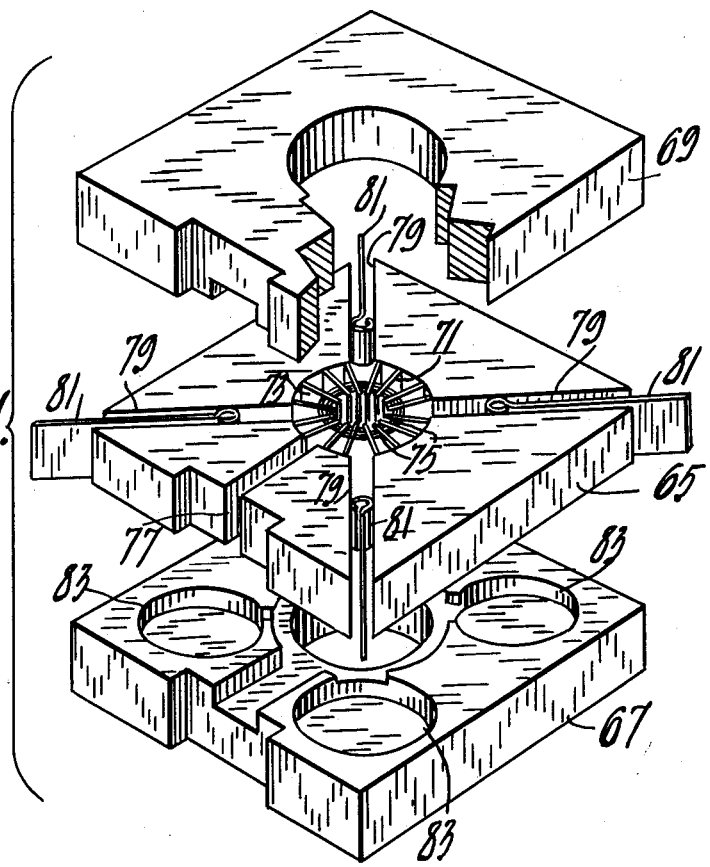
Fig. 11 is an exploded perspective view of a magnetron structure incorporating a fourth embodiment of the invention.

Referring to Figs. 1 and 2, Fig. 1 shows cold-test tuning curves and Fig. 2 shows the variation in power output over the tuning range of a 3 cm. pulsed magnetron having sixteen anode cavities with one anode cavity coupled to a single external tuning cavity resonator of adjustable length, similar to the magnetron shown in Fig. 3 with the tuning plunger of one tuning resonator set at a distance $d=0$. The cold-test tuning curves are obtained by exciting the magnetron anode and tuning cavity system by use of a signal generator coupled to magnetron through the output transformer. The resonance for each plunger position is then determined by adjusting the frequency of the signal generator for minimum power reflected from the magnetron. Fig. 1 shows that with the single tuning cavity plunger set at $d=0$, in which case the anode resonator system is symmetrical (except for the small impedance discontinuity at the output iris), the $\pi$ mode frequency was about 9500 mc./sec., and the frequencies of the two doublets of the $N/2-1$ mode were nearly equal and about 11,000 mc./sec. As the tuning plunger was moved outwardly to increase the distance $d$ up to 0.5 inch the tuned $\pi$ mode frequency (curve A) and one of the two doublets (curve B) where tuned, but the other doublet (curve C) was not tuned. As explained above, this results in most of the energy of the untuned doublet remaining in the anode, which favors operation of the magnetron in the undesired mode doublet instead of the desired tuned $\pi$ mode. Moreover, as shown by curve D in Fig. 2, when a magnetron is tuned by a single external tuning resonator the power output drops off very rapidly over a 500 mc. range.

The present invention provides an external tuning cavity resonator means that couples to both doublets of the undesired mode, and thereby effects tuning of both doublets. The invention is predicated on an appreciation of the fact that the standing waves of the two doublets are displaced or rotated a quarter wave length relative to each other along the anode structure. This displacement is shown in Fig. 1–15, page 18, of the book "Microwave Magnetrons" by George B. Collins, for a magnetron anode having $N=8$ anode segments, in which case the $N/2-1$ mode is the $n=3$ mode. In said Fig. 1–15, it can be seen that for each doublet of the $n=3$ mode the charge distribution at points 90° apart along the array is zero, maximum, zero, etc., and that each point of one doublet corresponds to a maximum point of the other doublet. In accordance with the invention, a multi-cavity magnetron is provided with two or more tuning cavity resonators coupled to the magnetron cavities at points angularly spaced from each other by 90°. In the case of two such tuning resonators, when one tuning resonator couples to a maximum radio frequency field of one doublet, the other tuning resonator couples to a maximum radio frequency field of the other doublet, and hence, both doublets will be tunable by the two tuning resonators. With more than two tuning resonators the same is true with more effectiveness of tuning due to the tuning of each doublet at more than one point.

In Fig. 3, an anode block 1 is formed with a central hole 3 in which are mounted a series (sixteen, as shown) of radially extending anode vanes 5, the inner ends of which define an interaction or cathode space. The vanes 5 together with the surrounding anode block 1 form an annular series of array of anode resonant cavities 7 the shape and size of which determine the natural or untuned resonant frequency of the magnetron. Suitable means, such as a quarter-wave output transformer slot 9, is coupled to one of the anode cavities 7 for coupling to an output waveguide. In accordance with one form of the invention, the anode block 1 is formed with two radial projections 1a and 1b, having two identical slots 11a and 11b extending radially from and opening into two anode cavities 7a and 7b angularly spaced from each other by 90°, as shown. Slidably mounted in the slots 11a and 11b are two tuning plungers 13a and 13b. The two slots and tuning plungers form tuning cavity resonators of adjustable length closed at the outer ends and opening into the anode cavities. The effective length of each cavity is indicated by the dimension $d$. In Fig. 3 only the anode block 1 is shown, for clarity. It will be understood that the complete magnetron will be provided with anode end plates and magnetic pole pieces, a central cathode, means closing the sides of the tuning cavity resonators, and means completing a vacuum envelope, as in the embodiment shown in Figs. 6–8. Strapping means may be provided on the anode vanes 5, to favor $\pi$ mode operation. The two plungers 13a and 13b may be ganged together by any suitable means, for simultaneous and equal tuning of the two tuning resonators.

In cold-test tuning of the structure shown in Fig. 3, when one tuning plunger, say 11b was kept at $d=0$, thus rendering slot 11b ineffective, and the other tuning plunger was moved outwardly from $d=0$ to $d=0.5$ inch, tuning and output curves such as those shown in Fig. 1 and 2 were obtained. However, when both plungers 13a and 13b were moved out equally the anode structure was tuned as shown in Fig. 4 shows that the use of two tuning resonators angularly spaced 90° from each other achieved the principal object of the invention, that is, it caused the tuning means to couple to and tune both doublets of the $N/2-1$ mode (curves B' and C'). Since both doublets are tuned, the objectionable storing of the energy of the untuned doublet in the anode is eliminated, together with the tendency of the magnetron to operate in the undesired mode. Moreover, Fig. 5 shows that the frequency range of operation has been increased by the use of two tuning cavity resonators to about 1000 mc., or a 10% band, with fairly good power output.

Figs. 6 to 8 show a magnetron similar to that of Fig. 3 but having parallel tuning resonators which are more easily gang-tuned than the radial tuning resonators of Fig. 3. As shown best in Fig. 6, the magnetron is similar to 4J50 type magnetron with tuning resonators added, and comprises a central anode block or plate 15 sandwiched between and hermetically sealed to two apertured end plates 17 and 19. The anode plate 15 is formed with a central hole in which a series of radial anode vanes 21 are mounted to form an annular array of resonant anode cavities 23. As shown, the alternate anode vanes 21 are strapped together by a pair of straps 25 to favor $\pi$ mode operation of the tube. An output transformer slot 27 of H-shaped cross section is formed in the anode plate 15 and end plates 17 and 19, which opens into a conventional guide coupling member 29 hermetically sealed to said plates. The member 29 is provided with a gas-tight dielectric window 31 to complete that portion of the tube envelope.

Two pole pieces 33 and 35 of magnetic material are hermetically sealed to the outer surfaces of the end plates 17 and 19, with portions extending through the apertures in the end plates, as shown in Fig. 6. The pole pieces are adapted to cooperate with a pair of C-shaped external magnets (not shown) to provide the usual axial magnetic field within the magnetron. The pole piece 33 is hollow to receive a support 37 for a central cathode 39 in insulated relation. The cathode support 37 is mounted on the pole piece 33 by suitable means comprising an insulating sleeve 41 and metal ring 43. The pole piece 35 may be provided with an exhaust tubulation 45.

In accordance with the invention, the anode plate 15 is formed with a pair of identical parallel slots 47 opening into two anode cavities 23 that are angularly spaced 90° from each other. Two identical tuning plungers 49 are slidably mounted in each of the slots 47. The surfaces of the end plates 17 and 19 adjacent to slots 47 are formed with shallow recesses 51, as shown in Figs. 7 and 8. The slots 47, recesses 51 and plungers 49 form two ridge-type tuning cavity resonators of generally H-shaped cross-section coupled to the anode cavities 23.

The tuning plungers 49 may be attached to an enlarged head 53 of a shaft 55 slidable in a recess 56 in the plates 15, 17 and 19 and extending through a sleeve 57 sealed to the plates 15, 17 and 19. The vacuum envelope of the tube is completed by a corrugated flexible bellows 59 sealed at its ends to the shaft 55 and sleeve 57. The plungers 49 may be moved along the slots 47 by means of a tuning knob or nut 61 having differential screw threads engaging threads on the shaft 55 and the sleeve 57, as shown in Fig. 7.

The tuning and output curves for the magnetron shown in Figs. 6–8 are similar to those shown in Figs. 4 and 5.

Hot tests on tubes constructed with two 90° tuning resonators as shown in Fig. 3 and 6–8 showed that the tubes could be tuned over a range greater than 600 mc. before moding was encountered. However, due to variable electronic efficiency and high cathode temperature, practical operation is limited to about 500 mc. Although this represents considerable improvement over the original single tuning resonator tubes, the useable tuning range is not large enough for some applications.

Fig. 9 shows a magnetron having two identical tunable cavity resonators and two identical fixed-frequency tuning cavity resonators coupled to anode cavities at 90° intervals. The structure shown utilizes the same tuning resonator arrangement as that shown in Figs. 6–8, and hence, the same numerals have been applied to all parts identical in Figs. 6–8 and Fig. 9. The anode block or plate 15a, in addition to the identical tuning cavity resonator slots 47, is formed with two identical tuning cavity resonator slots 63 closed at their outer ends and opening at their inner ends into two anode cavities 23 diametrically opposite the two cavities 23 into which the tuning slots 47 open. Thus, the four cavity resonators 47, 47, 63 and 63 are angularly spaced 90° apart around the cavity array. The surfaces of the end plates 17a and 19a (not shown) are formed with recesses 64 adjacent to the slots 63 to form ridge-type cavity resonators.

The purpose of providing the fixed frequency resonators 63 is to improve the electronic efficiency and stabilize the cathode temperature over a relative wide tuning range as compared with a magnetron having just the two tuning resonators as shown in Figs. 6–8. In a 3 cm. magnetron incorporating the structure of Fig. 9 it was found that the two fixed-frequency resonators 63 alone tuned the anode about 300 mc. below its natural resonant frequency and lowered the electronic efficiency from about 67% to about 60% at the highest frequency at which the structure would operate when the tuning plungers 49 were set at $d=0$, as shown by the point E on the graph in Fig. 10. When the plungers 49 were moved out a distance $d$ equal to the fixed cavity length the radio frequency field pattern in the anode was made symmetrical and an efficiency of 70% was obtained (point E). This tuned the anode over a frequency range slightly less than 300 mc. As the distance $d$ was further increased, the efficiency fell off slowly as indicated by the graph between points F and G. It was found that the magnetron could be tuned over a frequency range of about 1000 mc. with only a 10% change in electronic efficiency without moding difficulties.

Fig. 11 schematically shows a magnetron structure incorporating a symmetrical tuning resonator arrangement involving four identical ridge cavity resonators extending radially outwardly from four anode cavities spaced 90° apart. This structure comprises an anode block or plate 65 and two end plates 67 and 69, corresponding to the plates 15, 17 and 19 in Figs. 6–8. The anode block 65 is provided with anode vanes 71 forming anode cavities 73 therebetween, with alternate vanes connected by straps 75. An output transformer slot 77 of H-shaped cross section is formed in the plate 65 and end plates 67 and 69. In accordance with the invention, the anode block 65 is formed with four identical tuning slots 79 extending radially from four anode cavities 73 spaced 90° from each other, as shown. Four identical tuning plungers 81 are slidably mounted in the slots 79, for closing the outer ends of the slots to form adjustable tuning cavity resonators. The end plates 67 and 69 may be formed with recesses 83 cooperating with the slots 79 to form ridge-type resonators.

Fig. 12 is a top plan view of a magnetron incorporating the symmetrical tuning resonator arrangement of Fig. 11. The anode block 65a and end plates 67a and 69a are similar to the block 65 and plates 67 and 69 of Fig. 11 with the four corners cut off as shown at faces 66. The output transformer slot (not shown) opens into a wave guide coupling member 85 provided with a coupling flange 87, for connection to an output waveguide. The magnetron is provided with two pole pieces, one of which (89) is shown, sealed to the end plates 67a and 69a, as in Figs. 6–8, and may also be provided with heat radiating fins 90 attached to the anode block and end plates.

The anode block 65a is formed with four radial tuning slots 79a at 90° intervals in each of which is slidably mounted a tuning plunger 81a, shown in detail in Fig. 13. Each plunger 81a is attached to a cylinder 91 which is slidably mounted in a sleeve 93 sealed to the anode block 65a and end plates 67a and 69a at the face 66. A flexible bellows 95 is sealed to the cylinder 91 and sleeve 93 to complete the vacuum envelope of the tube while permitting movement of the tuning plunger 81a. Each tuning plunger is actuated by a tuning knob 97 rotatably mounted on the sleeve 93, as by means of an internal shoulder 97a and split spring ring 99 engaging the ends of an enlarged portion 93a of the sleeve. The knob 97 has a central pin or stud 101 threaded into the cylinder 91, whereby rotation of the knob effects movements of the tuning plunger 81a in the tuning slot 79a to change the length thereof.

As shown in Fig. 12, the magnetron may be provided with a large gear 103 mounted for rotation about the axis of the magnetron and engaging four smaller gear rings 105 attached to the four tuning knobs 97, for restraining the four tuning plungers 81a to simultaneous and equal movement in the four tuning slots 79a. The four plungers can be simultaneously actuated by manually turning one of the tuning knobs 97, or by means of an additional gear engaged with the large gear 103 and provided with an operating shaft and tuning knob (not shown).

The details of the mechanism for actuating the tuning plungers 79a, as shown in Figs. 12 and 13, are not part of the present invention, and hence the mechanism will be claimed only broadly, for example, as mechanically-ganged means for simultaneously and substantially equally adjusting the resonant frequency of the tuning cavity resonators.

Figure 14:
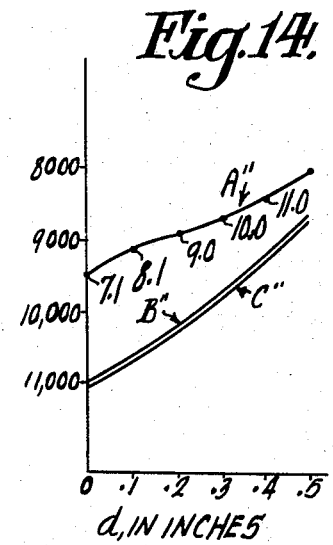
Fig. 14 is a graph showing tuning curves for the magnetron shown in Figs. 11–13.

Fig. 14 shows cold test tuning curves obtained with the magnetron shown in Figs. 11–13. Curve A″ is the tuning curve for the tuned π mode, and curves B″ and C″ are the tuning curves for the two tuned doublets of the $N/2-1$ mode. It can be seen that the four symmetrical tuning cavities not only couple to both doublets of the $N/2-1$ mode but also produce substantially equal tuning of the two doublets, whereas Fig. 4 shows that when two tuning resonators are used one doublet is tuned to a greater degree than the other.

The structure shown in Figs. 11–13 was hot tested in a bell jar vacuum system and the following results were obtained without moding difficulties when operating into a matched load:

| | |
|---|---|
| Tuning range (Equal plunger displacement) | 9.6 to 8.0 kmc. |
| Peak voltage | 22 kv. |
| Peak current | 21 amperes. |
| Peak power output | 160–200 kw. |
| Duty cycle | .001 second. |
| Electronic efficiency | 62–67% |
| Spectrum shape | Excellent. |

The coupling between the tuning resonators and the tuned π mode is shown by the pulling figures indicated at several points along the tuning curves in Figs. 1 and 14, between $d=0$ and $d=0.4$. The pulling figures in Fig. 1 show that the coupling was greatly reduced by the tuning of the single tuning resonator. On the other hand, as shown by the pulling figures in Fig. 14, when four tuning resonators were used the coupling did not vary greatly, and in fact actually increased somewhat as the resonators were tuned. This is a result of the symmetrical tuning arrangement which helps to maintain a constant impedance at the anode cavity coupled to the output of the tube.

Figure 17:
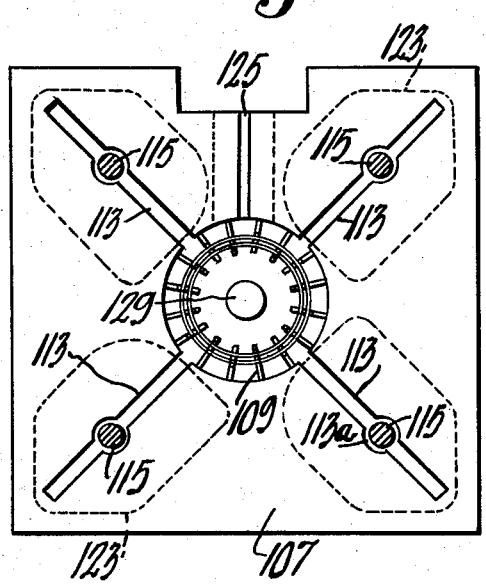
Fig. 17 is an enlarged transverse view taken on the line 17—17 of Fig. 16.
Figure 15:
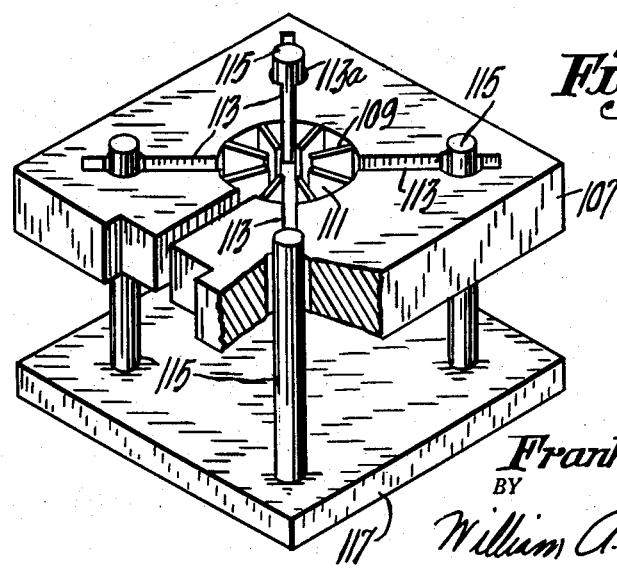
Fig. 15 is a perspective view of a fifth embodiment of the invention.
Figure 16:
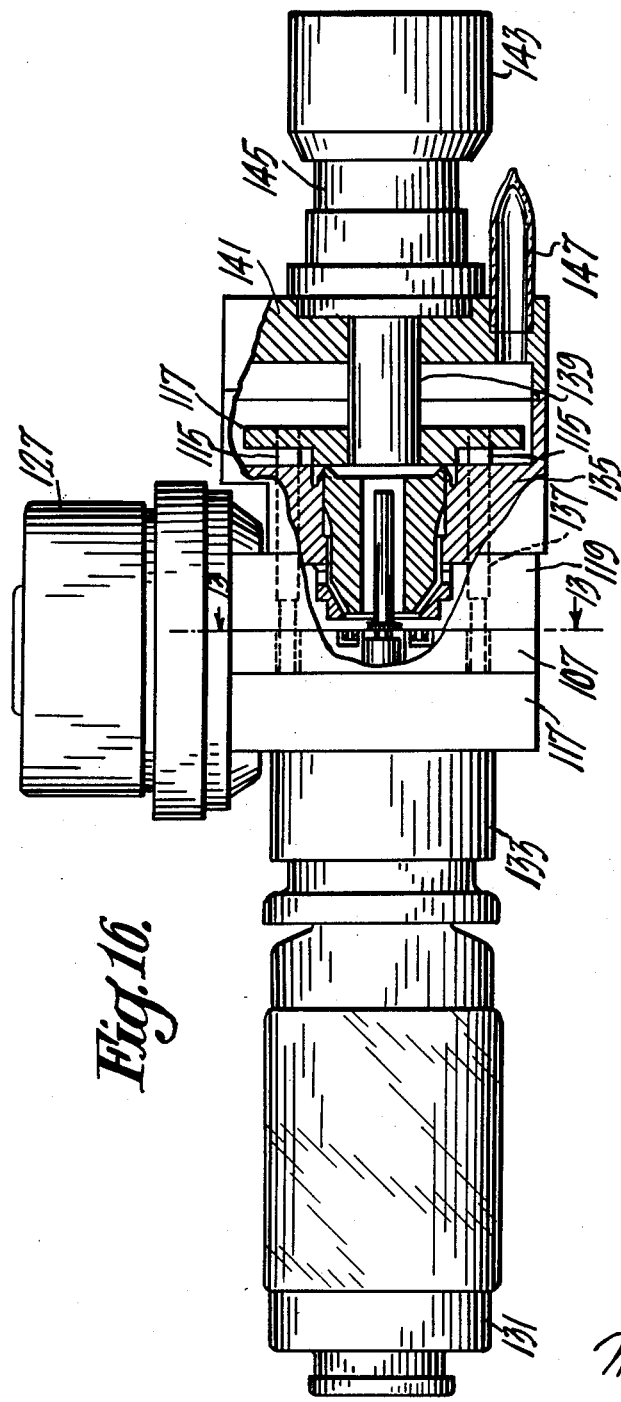
Fig. 16 is an axial sectional view of a magnetron incorporating the tuning arrangement shown in Fig. 15.

Figs. 15, 16 and 17 show a modification of the symmetrical arrangement of Figs. 11–13 in which the radial plungers are replaced by parallel non-contacting type tuning plungers connected together for gang tuning of the four tuning resonators. In the schematic arrangement shown in Fig. 15, an anode block or plate 107 is provided with anode vanes 109, defining anode cavities 111, and is formed with four radial slots 113 closed at the outer ends and opening symmetrically into four of the cavities 111 spaced 90° from each other. The slots 113 form identical tuning resonators. The effective electrical lengths of the resonator slots 113 are varied, to tune the anode structure, by means of four parallel rod-type tuning plungers 115 which are insertable in spaced relation at least partially through enlarged portions 113a formed in the slots 113. The four plungers are attached to a tuning block 117 for simultaneous and equal movement of all the plungers.

As shown in detail in Figs. 16 and 17, the anode block 107 is sandwiched between two end plates 119 and 121 which are formed with recesses 123 that cooperate with the slots 113 to form ridge-type cavity resonators, as in Figs. 6–8 and Figs. 11–13. The anode block 107 and end plates 119 and 121 are formed with an H-shaped output transformer slot 125 opening in a wave guide coupling member 127. A central cathode 129 is supported within the anode block 107 by an elongated cathode support 131 which is insulatedly mounted on one of two magnetic pole pieces 133 and 135 extending through the end plates 119 and 121, as in Fig. 6.

The pole piece 135 is formed with four parallel bores 137 aligned with the enlarged portions 113a of the slots 113, for slidably receiving the four tuning plungers 115. The tuning block 117, to which the tuning plungers 115 are attached, is mounted on a shaft 139 slidable in an aperture in a yoke 141 which is sealed to the pole piece 135. The shaft 139 may be adjusted, to move the tuning plungers 115 into the tuning slots 113 in varying degree, by means of a tuning knob or nut 143 in threaded engagement with the shaft 139 and a sleeve 145 sealed to the yoke 141 as in Fig. 7. An exhaust tubulation 147 may be mounted on the yoke 141.

Preferably, the slots or resonators 113 are made approximately a half wavelength long at the untuned frequency of the anode and the enlarged portions 113a are located at points of maximum electric field. The system will then resonate at the untuned π mode frequency without insertion of the tuning pins. When the ganged non-contacting tuning pins 115 are inserted, the resonant frequency of the system is lowered since the tuning resonators are loaded capacitively.

In operation, the tube structure shown in Figs. 15–17 gave results similar to the structure shown in Figs. 11–13. It was found that the tuning resonators coupled to and effectively tuned both doublets of the $N/2-1$ mode. Moreover, the tube had substantially constant electronic efficiency and a variation of cathode temperature of only about 50° C. over a 9% (800 mc.) tuning range. The following data were obtained in a hot test of a sealed-off tube without moding difficulties:

Tuning range _____ 8800–9600 mc.
Thermal drift _____ 0.1 mc./deg. C.
Pushing figure _____ 0.15 mc./amp.
Pulling figure _____ 5–8 mc.
Peak power output at 22 kv. and 22 amp. _____ 165–200 kw.
Spectrum shape _____ Excellent.

In the description of the various embodiments of the invention shown, it has been assumed that the tuning cavity resonators have the same resonant frequency and are tuned equally. A perfectly symmetrical arrangement is ideal for tuning both doublets of the $N/2-1$ mode and thereby avoiding mode jumping. However, even though the tuning cavity resonator structure is symmetrical, the magnetron anode will not be completely symmetrical due to the small discontinuity presented by the output transformer slot and also due to machining tolerances. These asymmetries will cause the frequencies of a doublet mode to be different, and will also cause unequal loading of the doublets by the output load, so that undesired oscillations may occur in one of the doublet modes. Both doublets can be equally loaded, to prevent undesired oscillations at either of the doublet frequencies, by introducing suitable discontinuities in the anode structure in a diametral plane angularly displaced 45° from the output coupling means. Applying this principle to the plural tuning resonator structure of the present invention, the coupling of the doublet modes to the output load may be improved, without appreciably affecting the tuning of both doublets, by introducing slight discontinuities in the symmetry of the tuning resonators. For example, in the magnetron shown in Figs. 11–13, each pair of diametrically opposed tuning resonators 79a lies in a diametral plane at 45° from the output line. The desired discontinuities can be introduced by making the resonant frequency of one diametral pair of resonators slightly different from the other diametral pair. This was done in practice by first inserting all of the plungers 81a all the way in ($d=0$), backing two of them out a distance of .050 inch (50 mils), and then engaging the large gear 103 with the smaller gear rings 105. Thus, throughout the tuning range the length of two diametral tuning resonators 79a differed from the other two by a constant amount. Therefore, the present invention is not limited to tuning cavity resonators having exactly the same resonant frequency throughout the tuning range.

What is claimed is:

1. A tunable magnetron including a cathode, an anode structure symmetrical about said cathode and comprising an annular array of resonator cavities, and a plurality of at least two and not more than four substantially-identical mechanically-tunable cavity resonators each directly coupled to one of a like plurality of said resonator cavities angularly spaced 90° from each other around said array, the remainder of said resonator cavities being untuned.

2. A tunable magnetron including a cathode, an anode structure symmetrical about said cathode and comprising an annular array of resonator cavities, a plurality of at least two and not more than four substantially-identical tuning cavity resonators individually coupled to resonator cavities angularly spaced 90° from each other around said array, the remainder of said resonator cavities being untuned, and mechanically-ganged means for simultaneously and substantially equally adjusting the resonant frequency of said tuning cavity resonators.

3. A tunable magnetron including a cathode, an anode structure symmetrical about said cathode and comprising an annular array of radially-extending resonator cavities, and a plurality of at least two and not more than four tuning cavity resonators each opening at one end into the outer end of one of a like plurality of said resonator cavities angularly spaced 90° from each other around said array, the remainder of said resonator cavities being untuned, at least two adjacent ones of said tuning cavity resonators being substantially identical and each provided with a movable tuning plunger for adjusting the resonant frequency thereof.

4. A tunable magnetron as in claim 3, further including common means connected to said tuning plungers for simultaneously and equally moving said plungers.

5. A tunable magnetron including a cathode, an anode structure symmetrical about said cathode and comprising an annular array of radially-extending resonator cavities, two parallel substantially-identical tuning cavity resonators each opening at one end into the outer end of one of two of said resonator cavities angularly spaced 90° from each other around said array, the remainder of said resonator cavities being untuned, each of said tuning cavity resonators being closed at the other end by a slidable tuning plunger, and common means connected to said tuning plungers for simultaneously and equally moving said plungers to adjust the lengths of said tuning cavity resonators.

6. A tunable magnetron including a cathode, an anode structure symmetrical about said cathode and comprising an annular array of resonator cavities, and four tuning cavity resonators each directly coupled to one of four of said resonator cavities angularly spaced 90° from each other around said array, the remainder of said resonator cavities being untuned, at least two adjacent ones of said tuning cavity resonators being substantially identical and provided with means for adjusting the resonant frequency thereof.

7. A tunable magnetron as in claim 6, wherein only two of said tuning cavity resonators are tunable, the other two having fixed, substantially-equal resonant frequencies.

8. A tunable magnetron including a cathode, anode structure symmetrical about said cathode and comprising an annular array of resonator cavities, two identical tunable cavity resonators opening into two of said resonator cavities angularly spaced 90° from each other around said array, and two substantially-identical fixed-frequency cavity resonators opening into two of said resonator cavities diametrically opposite said first-named two cavities, the remainder of said resonator cavities being untuned.

9. A magnetron as in claim 8, wherein said fixed-frequency cavity resonators are closed at their outer ends and have an electrical length less than a half wavelength at the untuned $\pi$ mode frequency of said anode cavities.

10. A magnetron as in claim 8, including mechanically-ganged means for simultaneously and substantially-equally adjusting the resonant frequency of said two tunable cavity resonators.

11. A tunable magnetron including a cathode, an anode structure symmetrical about said cathode and comprising an annular array of resonator cavities, and four substantially-identical mechanically tunable cavity resonators each directly coupled to one of four of said resonator cavities angularly spaced 90° from each other around said array, the remainder of said resonator cavities being untuned.

12. A tunable magnetron including a cathode, an anode structure symmetrical about said cathode and comprising an annular array of resonator cavities, four substantially-identical tuning cavity resonators each directly coupled to one of four of said resonator cavities angularly spaced 90° from each other around said array, the remainder of said resonator cavities being untuned, and mechanically-ganged means for simultaneously and substantially-equally adjusting the resonant frequency of said four tuning cavity resonators.

13. A tunable magnetron including a cathode, an anode structure symmetrical about said cathode and comprising an annular array of radially-extending resonator cavities, and four substantially-identical tuning cavity resonators each opening at one end into and extending radially outwardly from one of four of said resonator cavities angularly spaced 90° from each other around said array, the remainder of said resonator cavities being untuned, each of said cavity resonators being closed at the other end by a slidable tuning plunger.

14. A tunable magnetron including an anode block formed with a cylindrical aperture, an annular array of radial anode vanes mounted in said aperture and defining a central cathode space, said vanes and the wall of said aperture forming an annular array of anode cavities open toward said space and coupled together to form a single resonant system, a cathode axially mounted in said cathode space, said anode block also formed with four radial slots symmetrically opening into four of said anode cavities angularly spaced 90° from each other around said array, and conductive means cooperating with each of said slots to form a tunable cavity resonator, said means including a tuning plunger slidable in each slot to close the outer end thereof, and means external to said magnetron for actuating each of said tuning plungers, the remainder of said anode cavities being untuned.

15. A tunable magnetron including a cathode, an anode structure symmetrical about said cathode and comprising an annular array of radially-extending resonator cavities, four substantially-identical tuning cavity resonators each closed at one end and opening at the other end into one of four of said resonator cavities angularly spaced 90° from each other around said array, the remainder of said resonator cavities being untuned, said tuning cavity resonators extending radially outwardly from said cavities in a common plane normal to the axis of said array, four elongated tuning pins symmetrically mounted for movement into said cavity resonators in a direction normal to said common plane, with one pin in each resonator, and common means connected to said pins for simultaneously and equally moving said pins relative to said cavity resonators to adjust the resonant frequency thereof.

16. A tunable magnetron as in claim 15, wherein each of said tuning cavity resonators has an untuned electrical length of a half wavelength at the untuned resonant frequency of the anode resonator cavities, and said tuning pins are located at regions of maximum electric field in said tuning resonators.

References Cited in the file of this patent

UNITED STATES PATENTS

| | | |
|---|---|---|
| 2,415,253 | Linder | Feb. 4, 1947 |
| 2,418,469 | Hagstrum | Apr. 8, 1947 |
| 2,445,282 | Slater | July 13, 1948 |
| 2,493,091 | Sproull | Jan. 3, 1950 |
| 2,533,741 | Okress | Dec. 12, 1950 |
| 2,679,615 | Bowie | May 25, 1954 |
| 2,759,122 | Jenny | Aug. 14, 1956 |
| 2,794,175 | Kumpfer | May 28, 1957 |
| 2,801,367 | Spencer | July 30, 1957 |
| 2,801,368 | Brown | July 30, 1957 |